United States Patent [19]

Kulikov et al.

[11] 4,193,281

[45] Mar. 18, 1980

[54] DEVICE FOR MANUFACTURING COILED MAGNETIC CORES FOR ELECTRICAL MACHINES

[76] Inventors: Valery A. Kulikov, ulitsa Bobkova 8, kv. 2; Ernst A. Stepanian, Suzdalsky prospekt 7, kv. 41; Emilen A. Stepaniants, ulitsa Zelenaya 4, kv. 6, all of Vladimir, U.S.S.R.

[21] Appl. No.: 899,592

[22] Filed: Apr. 24, 1978

[51] Int. Cl.² .................. B21D 11/06; B21D 11/08; H02K 15/00
[52] U.S. Cl. .................................. 72/130; 29/596; 72/136; 72/137; 72/142
[58] Field of Search .................. 29/596, 605, 609; 72/135, 136, 137, 142, 167, 130, 132

[56] References Cited

U.S. PATENT DOCUMENTS

| | | | |
|---|---|---|---|
| 1,850,886 | 3/1932 | Lane et al. | 72/136 X |
| 1,920,154 | 7/1933 | Carlson | 72/136 |
| 2,812,794 | 11/1957 | Chapman | 72/136 |
| 3,577,851 | 5/1971 | Detheridge et al. | 72/135 X |
| 4,102,040 | 7/1978 | Rich | 29/596 X |
| 4,116,033 | 9/1978 | Iwaki et al. | 72/142 |

*Primary Examiner*—Ervin M. Combs

*Attorney, Agent, or Firm*—Lackenbach, Lilling & Siegel

[57] ABSTRACT

A continuously fed band is coiled edgewise into a coil so that a maximum elongation of said band occurs at its edge which forms the external diameter of the coil, whereas the elongation uniformly decreases towards the opposite edge. At one side of the band, radially extending recesses are provided. The proposed device for effecting the novel method comprises a bed having mounted thereon a band tensioning means, a straight guide and an arched guide between which there is interposed a shaping member. Recesses provided in the bed receive a rotary disc having fingers which are uniformly spaced thereon and set into reciprocating motion with the aid of a cam. The continuously fed band is driven along two guide channels, one of which is straight and formed by the bed and the straight guide. The second guide channel is arched and formed by a portion of the rotary disc and the arched guide. The shaping member is constructed as a die with a wedge-shaped head. The working edge of the wedge extends radially and at an angle to the side surface of the rotary disc. A drive is provided to set the die in reciprocating motion.

6 Claims, 9 Drawing Figures

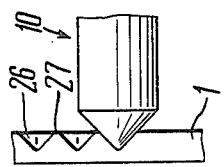
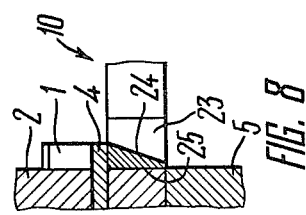
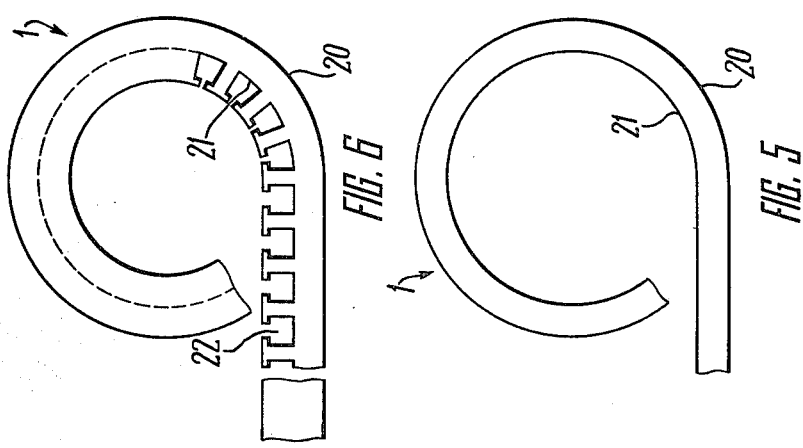

DEVICE FOR MANUFACTURING COILED MAGNETIC CORES FOR ELECTRICAL MACHINES

The present invention relates to the manufacture of electrical machinery and, more particularly, to methods and devices for manufacturing coiled magnetic cores for electrical machines.

The invention is readily applicable to the manufacture of stators and rotors of electrical machines.

BACKGROUND OF THE INVENTION

The development of the new method for manufacturing magnetic cores for electrical machines was necessitated by the need for magnetic core turns having accurate geometrical parameters which would make it possible to meet the efficiency requirements imposed upon magnetic cores of electrical machinery. Another reason for the development of the new method was the desire to automate the magnetic core manufacturing process and use a single piece of equipment for the purpose.

There is known a method for manufacturing coiled magnetic cores (cf. copending U.S. Patent Application Ser. No. 766,918; filed Feb. 9, 1977 having two common inventors with the present application). According to this method, a continuously fed band is coiled edgewise so that a maximum elongation occurs at that edge of the band which forms the external diameter of the coil, whereas there is a uniform decrease in the elongation towards the opposite edge of the band. The coiling of the continuously fed band is done by fluting the band, while maintaining its rectilinear motion. The flutes are then straightened out, whereby the coil is produced.

The method under review is disadvantageous in that the fluting results in an elongation of the band's material; there is a direct relationship between the geometrical parameters of magnetic cores and the relative elongation of the material. The elongation of the fibers of the band's material is at its maximum in the zone of the external diameter of the coil; it must not be in excess of the permissible relative elongation value of the material, otherwise the material will be ruptured in the maximum deformation zones.

The application of the method under review is further limited by the fact that the possibility of such a rupture increases with an increase in the height of the yoke and a decrease in the coil's diameter. This method does not make it possible to manufacture magnetic cores for electrical machinery of all types and sizes.

There is known a device for manufacturing coiled magnetic cores for electrical machines (cf. British Pat. No. 1,114,055). The device comprises a bed whereupon there are mounted a band tensioning means, a straight guide and an arched guide between which there is interposed a shaping member. The bed is provided with a recess receiving a rotary disc carrying uniformly spaced fingers. The device further includes two guide channels one of which is straight and formed by the bed and the straight guide, whereas the second is arched and formed by a portion of the rotary disc and the arched guide. Finally, the device includes a cutter to separate the coil from the rotary disc, and a cam to set the fingers in reciprocating motion.

On the working side of the rotary disc there are recesses shaped as cones or pyramids whose vertices are directed towards the external diameter of the rotary disc. The shaping member is a roll having projections on its outer surface. The projections are spaced uniformly, and their shape corresponds to that of recesses provided in the rotary disc.

When the device is in operation, the projections of the roller are received in the recesses of the rotary disc, and the band is appropriately shaped between them.

The device under review is intended for carrying out a well-known method for manufacturing coiled magnetic cores. According to this method, a flexible band is coiled edgewise by fluting it in the transverse direction without changing the band's thickness. The flutes of the coil thus produced have a maximum perimeter on the side of the internal diameter; the perimeter of the flutes uniformly decreases towards the outer edge. When a magnetic core pack is assembled from such coils, the convex flutes of one turn are received in the concave flutes of the adjacent turn. The presence of the flutes in the finished pack prevents close contact between turns of the magnetic core coil. On straight portions, considerable gaps are produced between the sheets, which cannot be eliminated by pressure molding. Such a loose pack accounts for an unnecessarily great length of the electrical machine, unnecessarily heavy losses of copper, reduced efficiency, and strong magnetic noise.

It is therefor, a principle object of the present invention to improve the quality of coiled magnetic cores and simplify their manufacture.

SUMMARY OF THE INVENTION

The present invention essentially resides in providing a method for manufacturing coiled magnetic cores for electrical machines, whereby a continuously fed band is coiled edgewise so that a maximum elongation of the band occurs at the edge which forms the external diameter of the coil, whereas the elongation uniformly decreases towards the opposite edge of the band. The method is characterized in that the coiling of the continuously fed band is accompanied by providing radially oriented recesses at least on one side of the band.

The invention further resides in providing a device for manufacturing coiled magnetic cores, comprising a bed having mounted thereon a means for tensioning the continuously fed band, a straight guide and an arched guide with a shaping member interposed between them, and a rotary disc with fingers uniformly spaced thereon. The disc is received in a recess provided in the bed, and the device further including two guide channels one of which is straight and formed by the bed and the straight guide, whereas the other is arched and formed by a portion of the rotary disc and the arched guide. Other elements of the device include a cutter for separating the coil from the rotary disc and a cam for setting the fingers in reciprocating motion. The device are characterized in that the shaping member is a die having a head shaped as a wedge whose working edge is arranged radially and at an angle to the side surface of the rotary disc, and the device also contains a drive for setting the shaping member in reciprocating motion.

The use of the proposed method and device for manufacturing coiled magnetic cores for electrical machinery makes it possible to produce magnetic cores for electrical machinery of all types and sizes, all of which are capable of realizing the desired efficiency targets.

BRIEF DESCRIPTION OF THE DRAWINGS

Other objects and advantages of the present invention will become more apparent from the following detailed description of a preferred embodiment thereof to be read in conjunction with the accompanying drawings, wherein:

FIG. 5 is a plan view of a band prior to and after deformation;

FIG. 6 is plan view of a band, provided with recesses, prior to and after deformation;

FIG. 8 is a sectional view of the band and shaping member, taken at the time of deformation; and FIG. 9 is a bottom view of the band and shaping member.

DETAILED DESCRIPTION OF THE INVENTION

Figure 1:
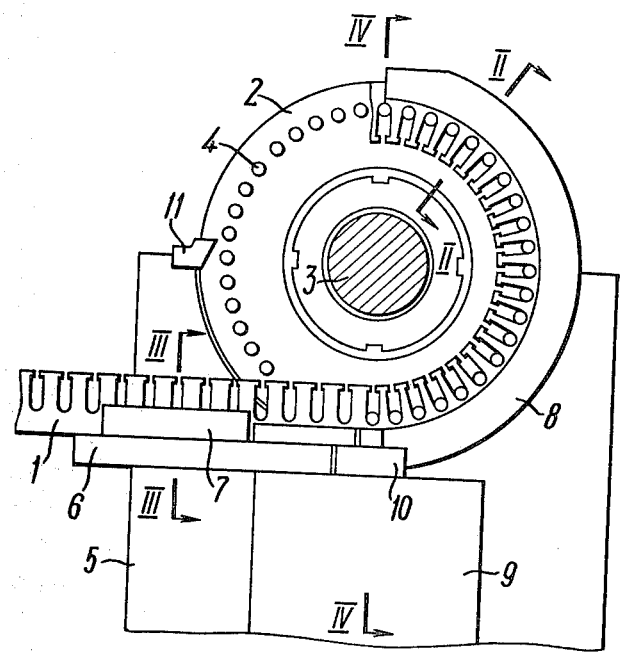
FIG. 1 is a general plan view of a device for manufacturing coiled magnetic cores, in accordance with the invention.

The device for manufacturing coiled magnetic cores from a continuously fed band 1 (FIG. 1) comprises a rotary disc 2 having a smooth working surface and the disc is mounted on a shaft 3. The disc 2 carries uniformly spaced fingers 4. Prior to being coiled, the band 1 is provided with recesses; the number of the fingers 4 is equal to that of the recesses in a single complete stator turn.

The device further includes a bed 5, having mounted thereon a straight guide 6, carrying a means 7 for tensioning the band 1, and an arched guide 8. Also mounted on the bed 5 is the housing of a drive 9 intended to set a shaping member 10 in reciprocating motion.

A detachable cutter 11 is mounted on the bed 5 and serves to separate the coiled band 1 from the disc 2.

Figure 2:
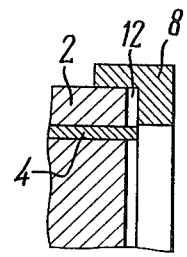
FIG. 2 is a sectional view taken on line II—II of FIG. 1.
Figure 3:
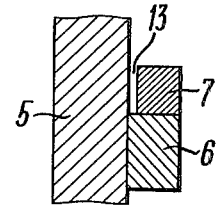
FIG. 3 is a sectional view taken on line III—III of FIG. 1.

The band 1 is drawn along guide channels 12 and 13. The guide channel 12 (FIG. 2) is arched (FIG. 1) and formed by a portion of the rotary disc 2 (FIG. 2) and the arched guide 8. The guide channel 13 (FIG. 3) is straight and formed by the bed 5, the straight guide 6 and the means 7 for tensioning the band 1 (not shown for convenience in FIGS. 2 and 3).

A cam 14 is secured to the bed 5 and serves to set the fingers 4 (FIG. 4) in reciprocating motion. The heads of the fingers 4 are in permanent contact with a groove 15 provided in the cam 14. The width of the groove 15 is somewhat greater than the height of the heads of the fingers 4; the groove 15 has a closed configuration.

The shaft 3 is driven by a drive 16. A bush 17 is mounted on the shaft 3 to serve as a stop for the rotary disc 2 and also to increase the latter's rigidity. The bush 17 and the disc 2 are secured on the shaft with the aid of a washer 18 and a nut 19.

FIGS. 5 and 6 show coiled bands 1. Following each deformation cycle, the elongation of the band 1 is at its maximum at an edge 20, which forms the external diameter of the coil, and at its minimum at an edge 21 which forms the coil's internal diameter. The band 1 (FIG. 5) may be solid; it may also be provided in advance with recesses 22 (FIG. 6).

Figure 7:
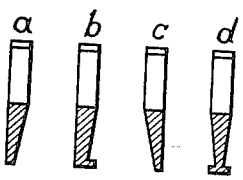
FIG. 7 presents different cross-sections of the band in the zone where it is acted upon by the shaping member.
Figure 4:
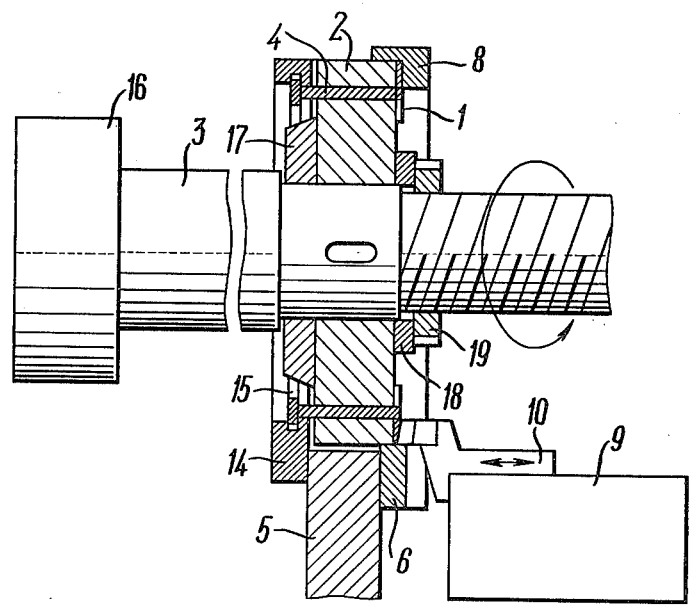
FIG. 4 is a sectional view taken on line IV—IV of FIG. 1.

FIG. 7 shows possible cross-sections a, b, c and d of the band 1 after it is acted on by the shaping member 10 (FIG. 4).

The cross-section a of the band 1 is produced by using the shaping member 10 (FIG. 8) constructed as a die having a head 23. The head 23 is shaped as a wedge in which the shape of the working edge 24, depending on the configuration of the coil profile shown in FIG. 7 (a, b, c, d and other embodiments not shown in the drawing) extends radially and at an angle to a side surface 25 of the rotary disc 2.

In order to bring the adjacent turns of a magnetic core as close together as possible throughout the height of the magnetic core pack, and in order to ensure a reliable conjugation between the pack and the electromotor's bed, it is necessary that elementary portions 26 (FIG. 9) in the zone of the edge 20 (FIGS. 5 and 6) should alternate with bands or portions 27 (FIG. 9) preserving the original thickness of the band 1.

The proposed device operates as follows. The band 1, which may be solid (FIG. 5) or provided in advance with recesses 22 (FIG. 6), is drawn through the tensioning means 7 (FIG. 1) so that its end is found between the straight guide 6 and arched guide 8. The cam 14 sets the finger 4 (FIG. 4) in reciprocating motion so that it is received in the recess 22 (FIG. 6) of the band 1. The device is then brought into action. To coil the band 1, the shaping member 10 (FIG. 9) successively deforms the solid portion of the band 1 throughout its length in the transverse direction so as to form the elementary portions 26 whose geometry makes it possible to produce a coil of a present shape with desired parameters depending on the configureation of the working edge of the die used. Following each deformation cycle, the elongation of the fibers of the material over the solid portion of the band 1 should be at its maximum at the edge 20, which forms the external diameter of the coil, and at its minimum at the edge 21. As the device is brought into action, the disc 2 (FIG. 4) starts rotating, the band 1 is brought into motion, and the fingers 4 are successively engaged with the recesses 22 (FIG. 6) of the band 1, because the heads of the fingers 4 (FIG. 4) are acted upon by the cam 14 in the zone between the straight guide 6 and arched guide 8. When the fingers 4 are meshed, the guide channel 12 is confined by them on one side over a range of 180°. The detachable cutter 11 (FIG. 1) is used to separate the coil from the rotary disc 2.

Depending on the geometrical parameters of magnetic cores to be produced, the device of this invention can vary the frequency at which the band 1 is deformed by varying the frequency of the reciprocating motion of the shaping member 10. The device can also vary the speed of the band 1 by varying the rotation speed of the disc 2. This is made possible due to the fact that the shaping member 10 and disc 2 are provided with individual drives 9 and 16, respectively (FIG. 4).

The proposed method and device for manufacturing magnetic cores for electrical machines have a number of advantages over the existing methods and devices used for the same purpose. These advantages are as follows:

The solid portion of the band 1 coiled into a magnetic core may be practically of any cross-sectional profile. This advantage enables one to determine optimum cross-sectional profiles of coiled magnetic cores to ensure high efficiency of electrical machinery.

The invention makes it possible to produce magnetic core packs for electrical machinery of all types and sizes.

The proposed process of manufacturing coiled magnetic cores is extremely simple.

The invention accounts for a high utilization factor of expensive electrical steel.

The novel method also ensures a high productivity; the invention makes it possible to automate the entire process of manufacturing magnetic core packs for electrical machinery.

Although the present invention has been described in some detail by way of illustration and example for the purposes of clarity of understanding, it will, of course, be understood that various changes and modifications may be made in the form, details, and arrangements of the parts without departing from the scope of the invention as set forth in the following claims.

What is claimed is:

1. A device for manufacturing coiled magnetic cores for electrical machines by bending a continuous band edgewise into a coil and wherein said band is provided with recesses, comprising a bed; means for tensioning said band mounted on said bed; a straight guide and an arched guide for said band mounted on said bed; a shaping element interposed between said guides; a rotary disc, mounted on a shaft and having an end face or side surface, received in a recess provided in said bed, a portion of the end face of said rotary disc facing said arched guide; said shaping element being a die having a wedge-shaped head with a working edge to produce a maximum elongation of said band at one edge forming the outer diameter of said coil; said working edge of said head extending radially and at an angle to said side surface of said rotary disc for forming a coil of a preset shape having at least one angled side surface formed by a series of elementary portions in the zone of the edge with maximum elongation alternate with portions preserving the original thickness of said band; uniformly spaced fingers mounted on said rotary disc and equal to the number of recesses in a single complete stator turn of said electrical machine; a cam secured to said bed for setting said fingers in reciprocating motion; for engagement with said band recesses two guide channels; for said band the first of said guide channels being straight and formed by said bed and said straight guide; the second guide channel being arched and formed by a portion of said rotary disc and said arched guide; and drive means for driving said shaping member in reciprocating motion, and for driving said shaft carrying said disc.

2. The device according to claim 1, wherein said drive means comprise separate drives for said shaping member and said shaft.

3. The device according to claim 2, wherein the frequency of the reciprocating motion of said shaping member is variable so that the frequency at which said band is deformed can be controlled.

4. The device according to claim 2, wherein the speed of said band is adjustable by varying the rotational speed of said disc.

5. The device according to claim 1, wherein said arched guide and said second guide channel covers an arc of about 180°.

6. The device according to claim 1, including a cutter for separating said coil from said rotary disc.

* * * * *